United States Patent
Lescoche

(10) Patent No.: US 8,307,990 B2
(45) Date of Patent: Nov. 13, 2012

(54) FILTER MODULE DESIGNED TO LIMIT ZONES OF STAGNATION FOR A LIQUID

(75) Inventor: Philippe Lescoche, Faucon (FR)

(73) Assignee: Technologies Avancees & Membranes Industrielles, Nyons (FR)

( * ) Notice: Subject to any disclaimer, the term of this patent is extended or adjusted under 35 U.S.C. 154(b) by 1284 days.

(21) Appl. No.: 10/839,704

(22) Filed: May 6, 2004

(65) Prior Publication Data
US 2005/0161395 A1    Jul. 28, 2005

(30) Foreign Application Priority Data
Jan. 22, 2004  (FR) .................................... 04 00587

(51) Int. Cl.
*B01D 63/00*   (2006.01)
*B01D 25/00*   (2006.01)
*B01D 29/00*   (2006.01)
*B01D 35/30*   (2006.01)

(52) U.S. Cl. ................ 210/455; 210/323.2; 210/321.89; 210/340; 210/445; 210/450; 210/451

(58) Field of Classification Search .................. 210/445, 210/450, 451, 455, 323.2, 321.87, 321.88, 210/321.89, 321.78, 321.79, 321.8
See application file for complete search history.

(56) References Cited

U.S. PATENT DOCUMENTS

| | | | | |
|---|---|---|---|---|
| 4,640,777 | A  * | 2/1987 | Lemonnier | 210/321.84 |
| 4,849,104 | A  * | 7/1989 | Garcera et al. | 210/323.2 |
| 5,554,283 | A  * | 9/1996 | Brinda et al. | 210/321.8 |
| 6,749,747 | B1 * | 6/2004 | Olapinski et al. | 210/184 |
| 2003/0038075 | A1 * | 2/2003 | Akimoto et al. | 210/321.79 |

FOREIGN PATENT DOCUMENTS
WO    WO 01/39857    *    6/2001    ................ 210/184

* cited by examiner

*Primary Examiner* — Benjamin Kurtz
(74) *Attorney, Agent, or Firm* — Millen, White, Zelano & Branigan, P.C.

(57) ABSTRACT

The invention provides a filter module comprising an outer casing provided at each end with a respective support plate for supporting at least one filter element for obtaining a filtrate that is recovered via an outlet passage provided in the vicinity of each support plate. According to the invention, each support plate is extended at right angles by an assembly skirt for assembling to the casing.

8 Claims, 2 Drawing Sheets

FILTER MODULE DESIGNED TO LIMIT ZONES OF STAGNATION FOR A LIQUID

This application claims priority to French Application No. FR 0400 587, filed Jan. 22, 2004.

The present invention relates to the technical field of molecular or particulate separation under the effect of pressure (bar-shaped membrane) implementing filter or separation elements generally referred to as "membranes" that are suitable under the effect of pressure for separating out molecules or particles from a fluid medium for treatment.

A particularly advantageous application of the invention lies in the field of filtering (in the broad sense) a fluid medium for treatment, and in particular in nanofiltration, ultrafiltration, microfiltration, etc.

BACKGROUND OF THE INVENTION

In the prior art, it is known to implement a filter module constituted by a metal casing fitted at each end with a support plate arranged to present one or more passages for enabling filter elements of tubular shape to be positioned relative to one another. The filter elements thus extend inside the outer casing, parallel to one another, and they are mounted in leaktight manner at each end to a support plate.

Each filter element is constituted by a porous support having formed therein one or more channels of inside surface provided with at least separator layer of nature and morphology that are adapted to separate out molecules or particles contained in the liquid medium flowing inside the channels. Such a filter element uses a sieve effect to separate out molecular or particulate species insofar as all molecules or particles larger than the diameter of the pores in the separator layer are stopped. Filter elements perform cross-flow filtering of the fluid medium in order to obtain at the peripheral surface of the filter elements the filtrate or permeate that is for recovery in a collection volume situated between the casing and the support plates. The casing is provided in association with each support plate with an outlet passage for the permeate, which passage is suitable for connection to a recovery circuit.

In order to provide sealing between the end portions of the filter elements and the support plates, sealing gaskets are put into position and clamped by means of a metal backing plate fixed against each support plate and enabling the filter module to be connected to a loop in which the fluid medium for treatment circulates.

In certain applications of the food industry type, for example, the need arises to ensure that the filter module does not present any zone in which a liquid can stagnate. Stagnating liquid is liable to lead to proliferation of bacteria that is prejudicial to the use of such filter modules for food purposes.

OBJECT AND SUMMARY OF THE INVENTION

The object of the invention is thus to satisfy this need by proposing a filter module designed to limit zones in which a liquid can stagnate.

To achieve such an object, the filter module comprises an outer casing provided at each end with a support plate for at least one filter element for obtaining a filtrate that is recovered via respective outlet passages provided in the vicinity of each support plate.

In accordance with the invention, each support plate is extended at right angles by an assembly skirt for assembling to the casing.

In a preferred variant embodiment, each outlet passage presents a flow section having at least one generator line tangential to the inside face of the adjacent support plate.

Thus, regardless of whether the filter module is installed in a high position or a low position in the flow circuit, no liquid can accumulate on the support plate situated in the low position insofar as the liquid is removed via the outlet passage provided in association with each adjacent support plate.

Preferably, the assembly skirt of each support plate possesses inside and outside diameters equal to the inside and outside diameters respectively of the casing.

For example, the assembly skirt of each support plate extends axially over a distance lying in the range 1 millimeters (mm) to 100 mm, and preferably in the range 1 mm to 50 mm.

In this variant embodiment, the filter module includes a bead of welding between the assembly skirt of each support plate and the casing.

Still in this preferred embodiment, it is found during the welding operation that the liquid metal spreads uniformly both over the outside surface and over the inside surface of the module so that joints can be obtained without microscopic defects in the filter module. This avoids microscopic rough zones appearing at the junction between the outer casing and each support plate, which zones might otherwise enable liquid to stagnate.

Preferably, each support plate provided with its assembly skirt and the casing are all made of a metal alloy that withstands oxidation.

In another variant embodiment, each support plate possesses internally a rounded connection fillet leading to the assembly skirt. For example, each rounded connection fillet possesses a radius lying the range 0.2 mm to 5 mm.

According to another characteristic of the invention, each support plate is fitted with an assembly system for assembly with a backing plate, a sealing gasket being interposed between a backing plate and an adjacent support plate and being received in a groove of volume smaller than the volume of the sealing gasket. Insofar as the sealing gasket presents a volume greater than the volume of its housing, it can be seen that there is no possibility of liquid accumulating.

BRIEF DESCRIPTION OF THE DRAWINGS

Various other characteristics appear from the following description made with reference to the accompanying drawing which shows an embodiment of the invention as a non-limiting example.

FIG. 2' is a view similar to FIG. 2 but showing an alternative configuration.

FIG. 3' is a view similar to FIG. 3 but showing the support plate configured to cooperate with the alternative embodiment of FIG. 2.

MORE DETAILED DESCRIPTION

Figure 1:
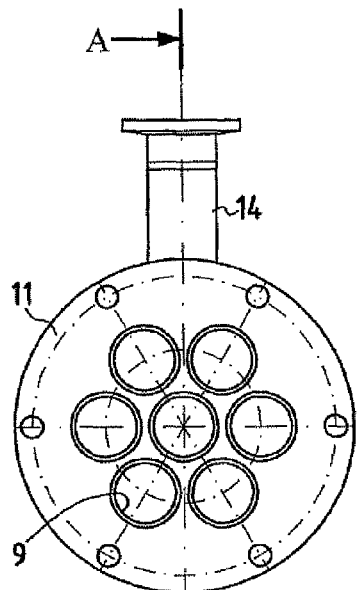
FIG. 1 is an end view of an embodiment of a filter module in accordance with the invention.
Figure 2:
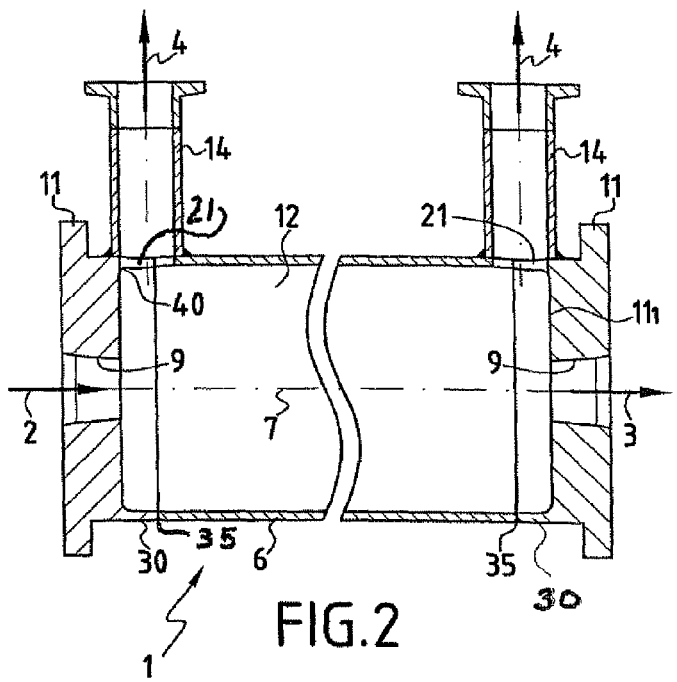
FIG. 2 is a section view substantially on line A-A of FIG. 1, showing a module without its filter elements.

As can be seen more clearly in FIGS. 1 and 2, the invention provides a device or module 1 for cross-flow filtering under the effect of a pressure, the filtering being applied to a fluid for treatment that can be of any kind. The module 1 is fed with the fluid for treatment via a feed circuit 2 which is shown diagrammatically and its outlet is connected to a return circuit 3 likewise shown diagrammatically. In conventional manner, the module 1 includes a circuit 4 for recovering the fraction of the fluid that has been separated out, i.e. the "permeate" or "filtrate", which circuit is shown diagrammatically.

Within an outer casing or ferrule 6, the module 1 contains at least one, and more generally a set of generally tubular filter elements 7 extending parallel to one another and represented in FIG. 2 solely by an axis. In conventional manner, the ferrule 6 presents a right cross-section that is circular.

Each filter element 7 is generally cylindrical in shape, presenting a right cross-section that is hexagonal or circular, for example. Each filter element 7 has at least one channel extending parallel to the longitudinal axis of the filter element and opening out at each of the end portions of the element into a passage 9 formed through a support plate 11. In conventional manner the surface of each channel in a filter element 7 is covered in at least one separator layer for coming into contact with the fluid for treatment flowing inside the channel. The nature of the separator layer(s) is/are selected as a function of the separation or filtration that is to be performed.

The filter elements 7 are mounted via each of their end portions to corresponding support plates 11, there being one support plate at each end of the outer casing 6. In conventional manner, each support plate 11 has the same number of passages 9 as there are filter elements 7 for mounting inside the casing 6. In the non-limiting embodiment shown, the module 1 is designed to be fitted with seven filter elements 7.

Figure 4:
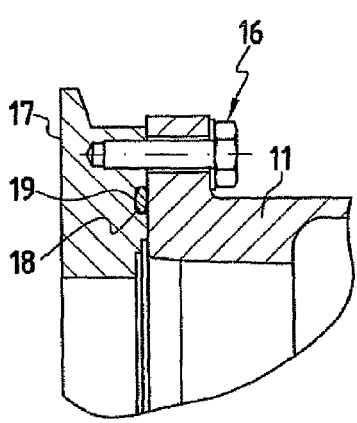
FIG. 4 is a section view of a detail of the filter module in accordance with the invention.

Each passage 9 is designed to be fitted with a sealing gasket for leaktight mounting of the filter elements 7 in the support plates 11. The support plates 11 co-operate with one another and with the casing 6 to define a chamber 12 for collecting the filtrate or permeate, which chamber communicates with the circuit 4 via outlet or recovery passages 14 for the filtrate or permeate. In conventional manner, each support plate 11 is designed to be mounted by means of an assembly system 16 of any appropriate type, for example a bolt and tapped-bore system in the embodiment shown in FIG. 4, with a clamping backing plate 17 serving to deform a sealing gasket 18 which is received in a groove 19 formed in the backing plate 17.

Figure 3:
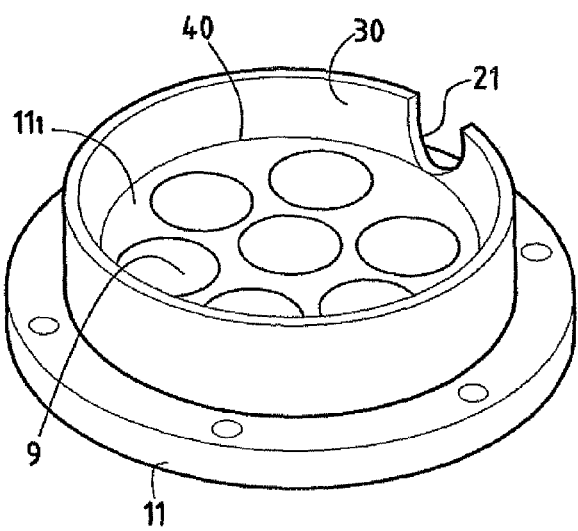
FIG. 3 is a perspective view of an embodiment of a support plate in accordance with the invention.
Figure 2:
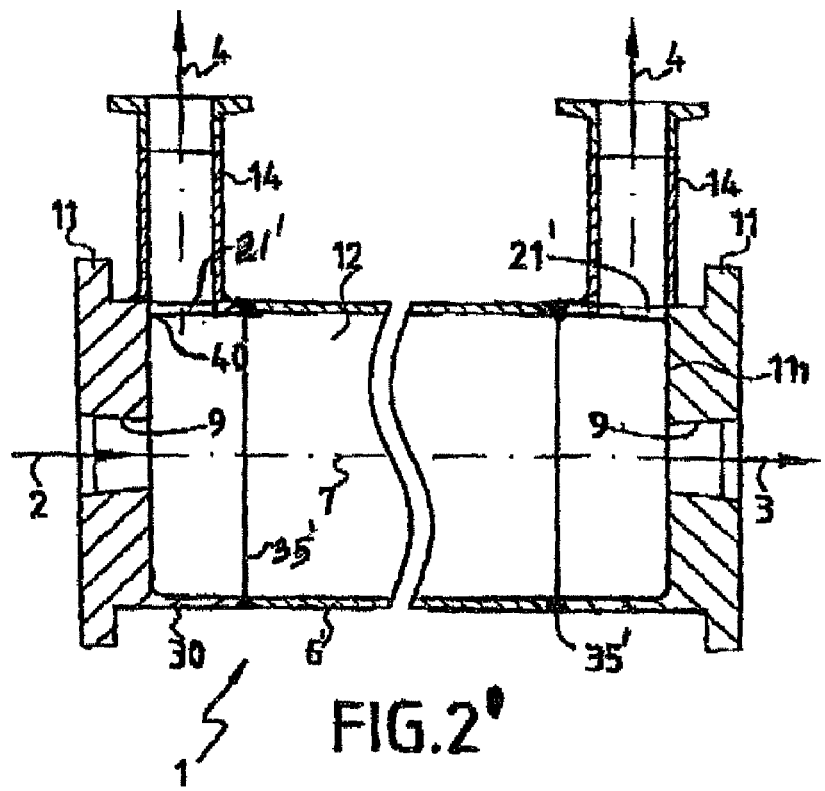
Figure 3:
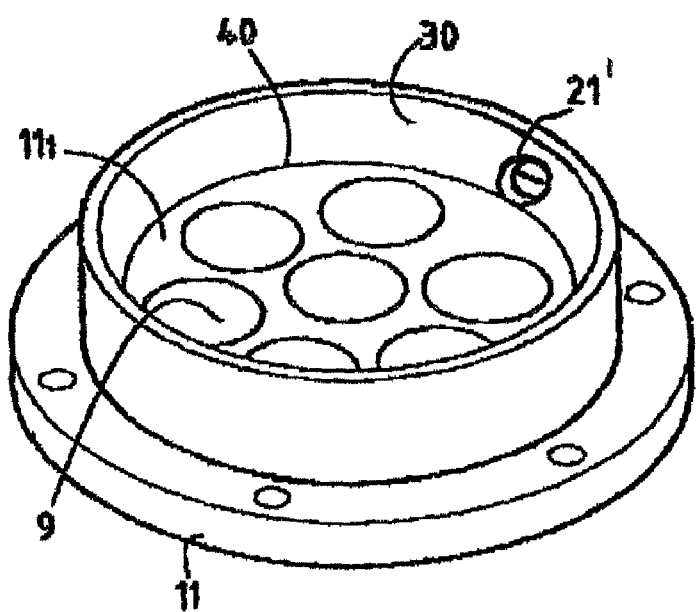

In accordance with the invention, each support plate 11 is extended at right angles by an assembly skirt 30 for assembling to the casing 6 as can be seen more clearly in FIG. 3. Preferably, the assembly skirt 30 of each support plate 11 possesses inside and outside diameters that are equal respectively to the inside and outside diameters of the casing 6. The casing 6 and each of the support plates 11 together with its assembly skirt 30 are all made of a metal alloy that withstands oxidation, such as stainless steel.

Advantageously, each support plate 11 is designed to be assembled to the outer casing 6 by a welding operation. A bead 35 of welding is thus provided between the assembly skirt 30 of each support 11 and the casing 6. Insofar as the welding operation is performed on masses of metal of similar size between the assembly skirt 30 and the casing 6, the liquid metal spreads uniformly both over the outside surfaces and over the inside surfaces of the two parts to be assembled together, thus making it possible to make welds without microscope defects.

In the example shown in FIGS. 2 and 3, the junction 35 between each support plate 11 and the casing 6 is provided level with the flow section of the outlet passages 14. Naturally, as is shown in FIGS. 2' and 3' provision can be made for this the junction 35' to be offset beyond the outlet passages 14. In this particular variant, and given the diameter of the outlet passages 14, the axial extent of the assembly skirts 30' needs to be increased beyond the values given above, e.g. to reach a value of 100 mm, for example. For the junction 35' to be offset beyond the outlet of the flange, the hole 21' must terminate within the outlet flange and is at least 50 mm.

It should be considered that each permeate outlet passage 14 is constituted by a tube end extending radially relative to the body formed by the assembled-together ferrule 6 and assembly skirt 30. According to other preferred embodiment characteristics, each outlet passage 14 presents a flow section 21 having at least one generator line tangential to the inside face $11_1$ of the adjacent support plate 11. Each outlet passage is thus tangential to the inside face of the support plate 11, thereby making it possible to avoid liquid accumulating on the low support plate 11 when the module is in a vertical position.

According to another preferred embodiment characteristic, each support plate 11 possesses internally a rounded connection fillet 40 joining the assembly skirt 30. As can be seen more clearly in FIG. 2, such a connection fillet 40 is made between the inside face $11_1$ of each support plate and the assembly skirt 30. Preferably, each rounded connection fillet 40 possesses a radius lying in the range 0.2 mm to 5 mm. Such a radius of curvature makes it possible to avoid liquid accumulating in this junction region under the action of capillarity forces.

According to another characteristic of the invention, the sealing gasket 18 is received in a groove 19 of volume that is smaller than the volume of the sealing gasket 18. Thus, after the backing plate 17 has been clamped into position, it is certain that the volume of the groove 19 is completely occupied by the gasket 18 so there does not exist any empty volume that might constitute a zone in which liquid could stagnate.

It can be seen from the above description that the filter module 1 of the invention is designed to ensure that it presents no zone in which liquid might stagnate, and which could lead to a proliferation of bacteria harmful to use of the filter module in the food industry, for example.

The invention is not limited to the embodiments described and shown since various modifications can be applied thereto without going beyond its ambit.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 04 00 587, filed Jan. 22, 2004, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A filter module comprising a metal outer casing with inside and outside diameters providing at each end with a respective metal support plate of a larger diameter for supporting at least one filter element for obtaining a filtrate that is recovered via an outlet passage provided in the vicinity of each support plate, each outlet passage presenting a flow section having at least one generator line tangential to the inside face of the adjacent support plate, wherein each support plate is extended axially at a distance of at least 50 mm at right angles thereto by a metal assembly skirt which is unitary with the support plate, the assembly skirt having inside and outside diameters equal to the inside and outside diameters of the casing, wherein the casing and skirt align when joined each support plate being welded to the casing by a bead of metal welding material to form junctures beyond each outlet passage, the bead of welding material being spread uniformly over outside surfaces and inside surfaces of the assembly skirts and casing to avoid microscopic defects that present zones in which liquid might stagnate, wherein each support plate possesses internally a rounded connection fillet leading to the assembly skirt, each rounded connection fillet having a radius lying in a range of 0.2 mm to 5 mm.

2. A filter module according to claim 1, wherein the casing and each of the support plates provided with its assembly skirt are all made of a metal alloy that withstands oxidation.

3. A filter module according to claim 1, wherein each support plate is fitted with an assembly system for assembly with a backing plate, a sealing gasket being interposed between a backing plate and an adjacent support plate and being received in a groove of volume smaller than the volume of the sealing gasket.

4. A filter module according to claim 1, made of stainless steel, wherein each support plate is fitted with an assembly system for assembly with a backing plate, a sealing gasket being interposed between a backing plate and an adjacent support plate and being received in a groove of volume smaller than the volume of the sealing gasket to avoid a zone in which liquid can stagnate.

5. A filter module according to claim 1 wherein the outer casing support plate and assembly skirt are made of stainless steel.

6. A filter module of claim 1 wherein each support plate is extended axially at a distance of up to 100 mm at right angles thereto by an assembly skirt that is welded to the casing by the bead of welding material.

7. A filter module according to claim 6, wherein the casing and each of the support plates provided with its assembly skirt are all made of a metal alloy that withstands oxidation.

8. A filter module according to claim 6, wherein each support plate is fitted with an assembly system for assembly with a backing plate, a sealing gasket being interposed between a backing plate and an adjacent support plate and being received in a groove of volume smaller than the volume of the sealing gasket.

* * * * *